(No Model.)

A. GALBRAITH
TIRE TIGHTENER.

No. 281,485. Patented July 17, 1883.

WITNESSES:
Donn Twitchell.
C. Sedgwick

INVENTOR:
A. Galbraith
BY
ATTORNEYS.

UNITED STATES PATENT OFFICE.

ARCHIMEDES GALBRAITH, OF AMADORE, MICHIGAN.

TIRE-TIGHTENER.

SPECIFICATION forming part of Letters Patent No. 281,485, dated July 17, 1883.

Application filed February 3, 1883. (No model.)

*To all whom it may concern:*

Be it known that I, ARCHIMEDES GALBRAITH, of Amadore, in the county of Sanilac and State of Michigan, have invented new and Improved Devices for Use in Tightening the Fellies and Spokes of Wheels, of which the following is a full, clear, and exact description.

My invention consists in a device for making the spokes of wheels fit tightly between the felly and the hub, and for expanding the fellies when the tire is larger than necessary. It is intended particularly for use with the felly-tightner shown in Letters Patent granted to me January 9, 1883, No. 270,413, and is to be applied in cases where the spokes are loose on account of the felly being of too great a diameter, as hereinafter fully described, and pointed out in the claim.

Reference is to be had to the accompanying drawings, forming a part of this specification, in which similar letters of reference indicate corresponding parts in both the figures.

Figure 1:
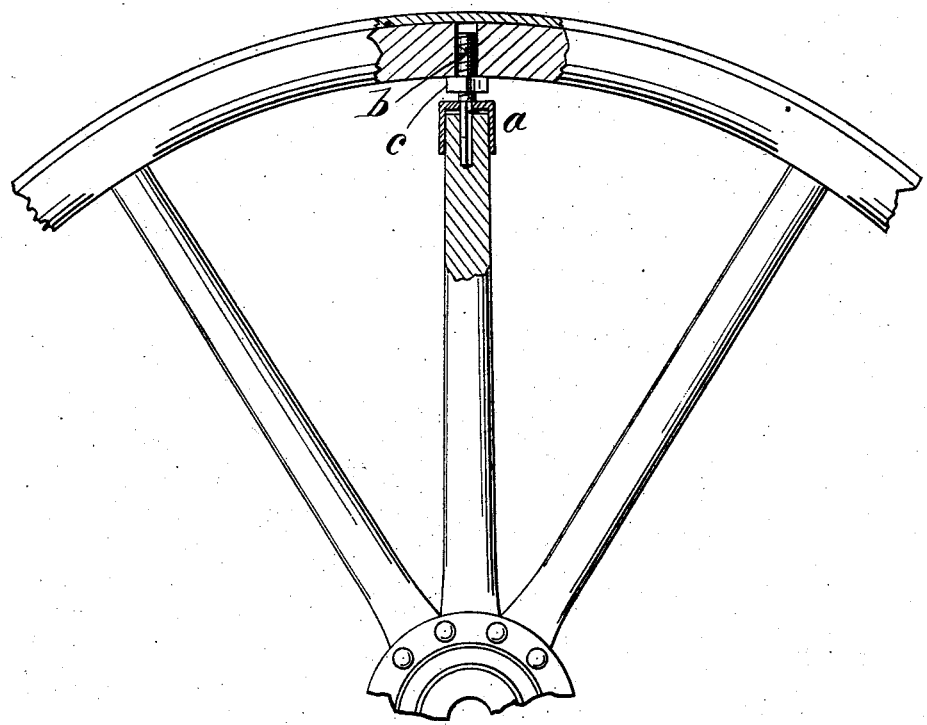
Figure 2:
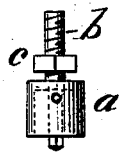

Figure 1 is a sectional side view of a portion of a wheel with my device applied thereto, and Fig. 2 shows the device separately.

The device consists of a cup, $a$, made of suitable material, covered to prevent it from chafing the wood, and of a size for fitting over the end of a spoke. In the center of the cup is fitted a screw-bolt, $b$, extending through at both sides of the cup, and upon the bolt is the nut $c$.

In using this device the cup $a$ is applied to the end of the spoke, one end of the bolt $b$ entering the end of the spoke and the outer or threaded end of the bolt entering the hole or mortise in the felly from which the spoke-tenon has been removed then by turning the nut $c$ so as to clamp against the felly the spoke will be forced endwise and tightened, and the felly expanded, if the tire be too large. In case there is not room for the device to be received between the spoke and felly, the spoke may be cut off. It will not be necessary to apply the device to more than three or four spokes of a wheel, but generally it should be applied to spokes on opposite sides. If necessary, a washer may be applied between the nut and the felly to give a broader bearing; and in order to give a finish to the end of the spoke, plastic material may be applied around the nut and painted; or the nut and bolt may be wound with twine and painted.

The cup portion $a$ will be perforated, as shown at $d$, so that paint can be put in on the end of the spoke.

The nut $c$ may have a cap or flange with holes in it for being secured against the felly by screws. This will strengthen the parts.

I am aware that a ferrule adapted to fit upon the end of a spoke, and carrying a screw which enters a nut revolving loosely in an aperture of the felly, has heretofore been employed, and I therefore do not claim such invention.

Having thus fully described my invention, I claim as new and desire to secure by Letters Patent—

An improved felly and spoke tightener, consisting of the perforated cup $a$, the screw $b$, extending through the cup, and adapted to have one end enter the end of the spoke and the other a mortise in the felly, and the nut $c$, substantially as herein shown and described.

ARCHIMEDES GALBRAITH.

Witnesses:
J. M. GAIGE,
WM. H. AITKIN.